(12) United States Patent
Neag et al.

(10) Patent No.: US 7,798,505 B2
(45) Date of Patent: Sep. 21, 2010

(54) SUSPENSION INTERLOCK SYSTEM

(75) Inventors: Dorinel Neag, Walled Lake, MI (US); Vernon S Siple, Ferndale, MI (US); Constantinos Sakatis, Oxford, MI (US); Ileana C Ball, Northtville, MI (US); Oh-Seong Kim, Oakland Township, MI (US); Stylianos A Meidanis, West Bloomfield, MI (US); Rajesh Garg, Troy, MI (US); Jerry R Balogh, Farmington Hills, MI (US); Brian J Haemmerle, New Baltimore, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 502 days.

(21) Appl. No.: 11/285,471

(22) Filed: Nov. 21, 2005

(65) Prior Publication Data
US 2007/0114745 A1 May 24, 2007

(51) Int. Cl.
*B60G 9/00* (2006.01)
(52) U.S. Cl. .................................................. 280/124.1
(58) Field of Classification Search ............. 280/124.1, 280/124.106, 754; 180/274
See application file for complete search history.

(56) References Cited

U.S. PATENT DOCUMENTS 3,869,140 A * 3/1975 Allison ................ 280/124.106
6,439,587 B2 * 8/2002 Fabris ................... 280/124.11
7,325,820 B2 * 2/2008 Allen et al. ............ 280/124.15
2006/0244233 A1 * 11/2006 Anderson et al. ..... 280/124.128

FOREIGN PATENT DOCUMENTS

JP          57186509 A   * 11/1982
JP          58016912 A   *  1/1983
JP          05139139 A   *  6/1993

* cited by examiner

Primary Examiner—Faye M. Fleming
(74) Attorney, Agent, or Firm—Ralph E. Smith

(57) ABSTRACT

A vehicle having a suspension system that supports a vehicle frame has a suspension interlock for governing the distance that the suspension system may move away from the frame during a vehicular rear impact event, thereby channeling impact forces through the suspension system and into the vehicle frame. A flexible member attaches to the vehicle frame and to the suspension system and acts as a tether to maintain the position of the suspension system relative to the frame. Alternatively, the suspension interlock may be a u-shaped bar mounted to the vehicular frame that interacts with a pin that is mounted to the suspension system. The pin resides within the confines of the u-shaped bar to maintain the position of the suspension system relative to the frame. Alternatively, a hooked plate may be used instead of a pin.

10 Claims, 5 Drawing Sheets

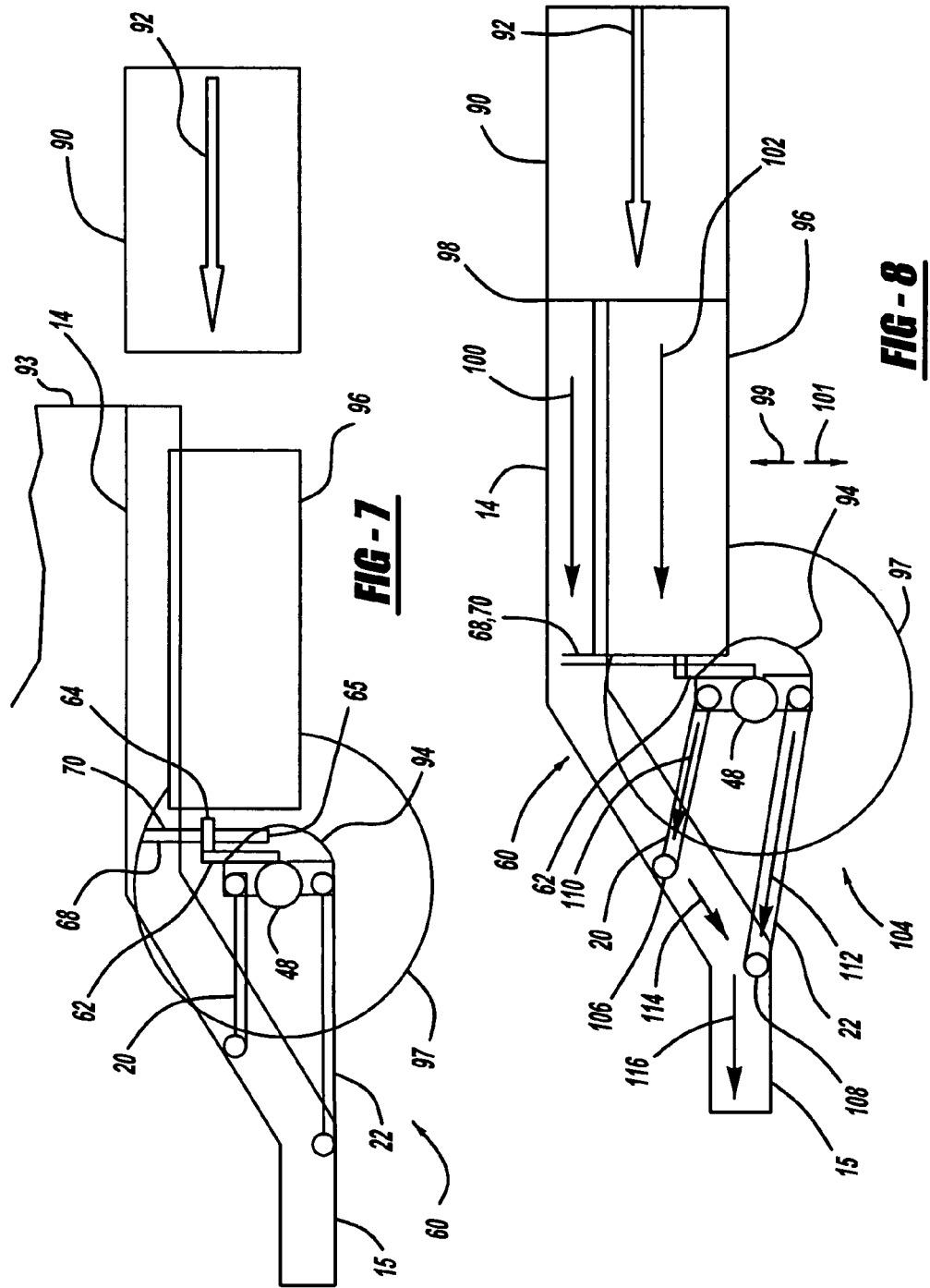

SUSPENSION INTERLOCK SYSTEM

FIELD OF THE INVENTION

The present invention relates to a vehicular suspension interlock system to restrain suspension travel during a rear impact event.

BACKGROUND OF THE INVENTION

Modern automotive vehicles typically have impact absorbing devices located in their rear areas to absorb impact forces and also channel impact forces into the vehicle frame during a vehicular rear impact event. In addition to the impact absorbing devices, vehicles may be equipped with rear suspension devices that usually do not function in conjunction with the rear impact absorbing devices during a rear impact event. While current impact absorbing devices have proven satisfactory for their applications, each is associated with its share of limitations. One limitation with rear impact absorbing devices is that they are designed to absorb all or most of the impact forces experienced by the rear of the vehicle during a rear impact. Another limitation is that current rear impact absorbing devices do not channel impact forces to other rear areas of the vehicle structures to utilize the impact absorbing capabilities of other rear area structures during a vehicular rear impact.

What is needed then is a device that does not suffer from the above limitations. This, in turn, will provide a vehicular device that, during a rear impact event, works in conjunction with the rear impact absorbing devices and channels the force of impact through additional areas of the vehicular frame.

SUMMARY OF THE INVENTION

A suspension interlock system for a vehicle having a rear suspension system that supports a vehicle frame further secures the rear suspension system to the vehicle frame. To secure the rear suspension system to the vehicle frame, the suspension interlock system may be a flexible member attached to the vehicle frame and the rear suspension system or a u-shaped bar attached to the vehicular frame that surrounds a pin attached to the rear suspension system.

Further areas of applicability of the present invention will, become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a side view of the suspension interlock system prior to a vehicular rear impact; and FIG. 8 is a side view of the suspension interlock system during a rear impact event.

DETAILED DESCRIPTION OF THE PREFERRED EMBODIMENTS

Figure 1:
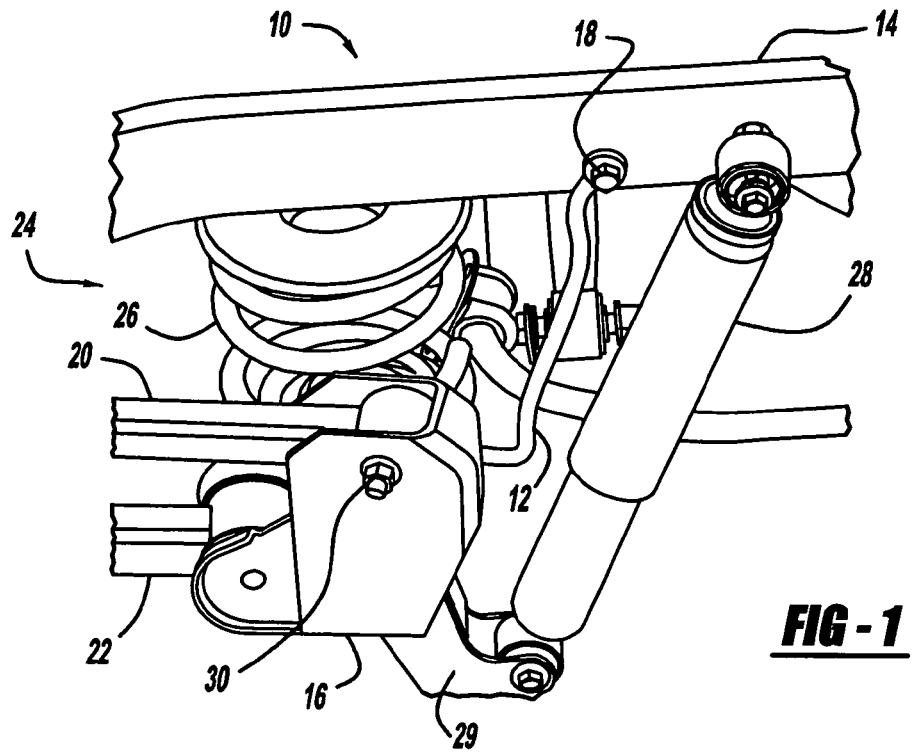
FIG. 1 is a side view of a rear suspension depicting the placement of a suspension interlock device of a first embodiment of the present invention.

The following description of the preferred embodiments is merely exemplary in nature and is in no way intended to limit the invention, its application, or uses. Turning first to FIG. 1, the components of a first embodiment of the suspension interlock system will be explained. The suspension interlock system 10 of a first embodiment is primarily composed of an interlock cable 12, a vehicular frame rail 14 and a trailing link bracket 16. The interlock cable 12 may be a cable with a circular cross-section sufficient in strength to achieve its purpose, which will be described later. The interlock cable 12 may be made from any one of a variety of materials, such as steel, titanium, etc. that are capable of providing sufficient strength. The cable 12 could also be a blend of metals or a non-metal material such as Kevlar.

A first end of the cable 12 is connected to the frame rail 14 by a fastener, such as a bolt 18; however, any acceptable fastening means may be used, including but not limited to, a rivet, a screw, or welding the cable 12 to the frame rail 14. The trailing link bracket 16 secures an end of the upper trailing link 20 and an end of the lower trailing link 22 of the suspension system 24. The opposite ends (FIGS. 7 and 8) of the links 20, 22 may be fixed to the frame rail 14 with brackets. Similarly to the first end of the cable 12, the second end of the cable 12 is attached to the trailing link bracket 16 by a bolt 30; however, any acceptable fastening means can be used, such as rivets, screws, welding, etc.

The suspension system 24 also entails a coil spring 26 that abuts against and attaches to the frame rail 14. The coil spring 26 works in conjunction with a shock absorber 28 to provide the proper support to the frame 14, and thus, the vehicle in which the suspension system 24 is installed. One end of the shock absorber 28 may be attached to a shock bracket 29, while the other end of the shock absorber 28 may be attached to the frame 14. The shock bracket 29 may also be attached to, or integrally a part of, the trailing link bracket 16.

Figure 2:
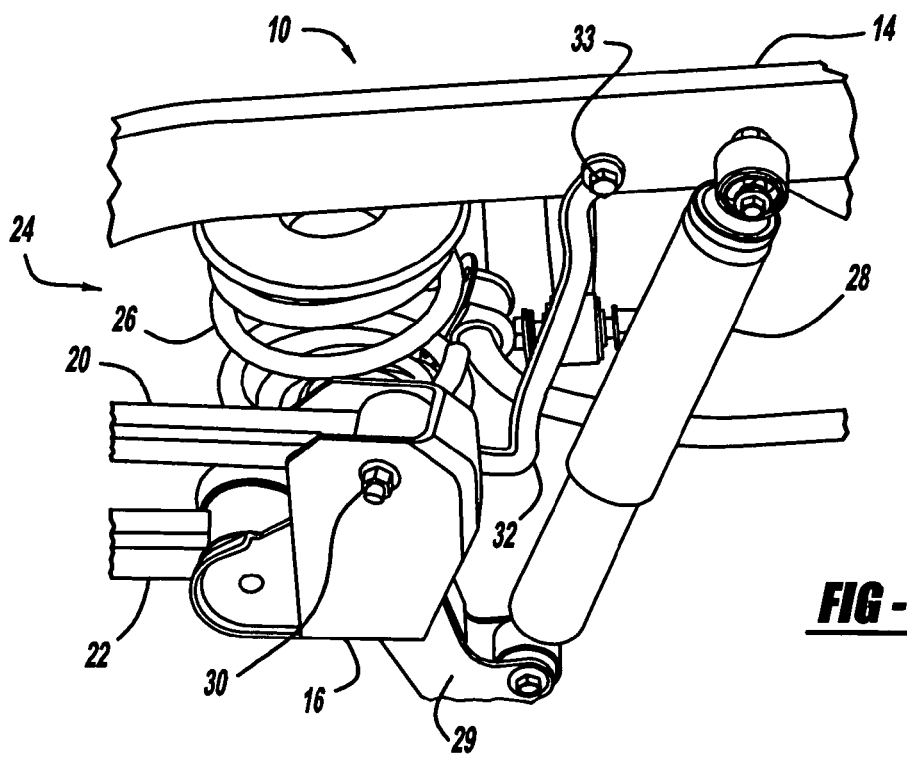
FIG. 2 is a side view of a rear suspension depicting the placement of a suspension interlock device of a second embodiment of the present invention.

In a second embodiment of the present invention, depicted in FIG. 2, a flat strap 32 is employed instead of the round cable 12 of the first embodiment. Because the flat strap 32 has an elongated oval or square cross-section, an advantage of the flat strap 32 over the round cable 12 is its potential to be folded into a more compact package, and its potential to flex in predictable directions, such as along the longer of its flat edges, when viewed in cross-section. Since the flat strap 32 may be predicted to fold and flex in certain directions, it may be packaged within a suspension system more advantageously. That is, because certain vehicles may have limited space within which to place such a suspension restraint, the flat strap 32 may be more advantageous than other cables or other restraint options. Additionally, the flat strap 32 may provide more advantageous mounting against the flat frame rail 14 because the flat strap 32 also has a wider, flat surface to provide a slimmer, lower-profile mount with comparatively more surface area than a circular cable. However, it is conceivable that either the circular cable 12 or the flat strap 32 may be secured into a mounting tab 33 before the mounting tab 33 is secured to the frame rail 14. By using a mounting tab 33, securing either the circular cable 12 or the flat strap 32 to the frame rail 14 may be performed in a more consistent fashion.

Figure 3:
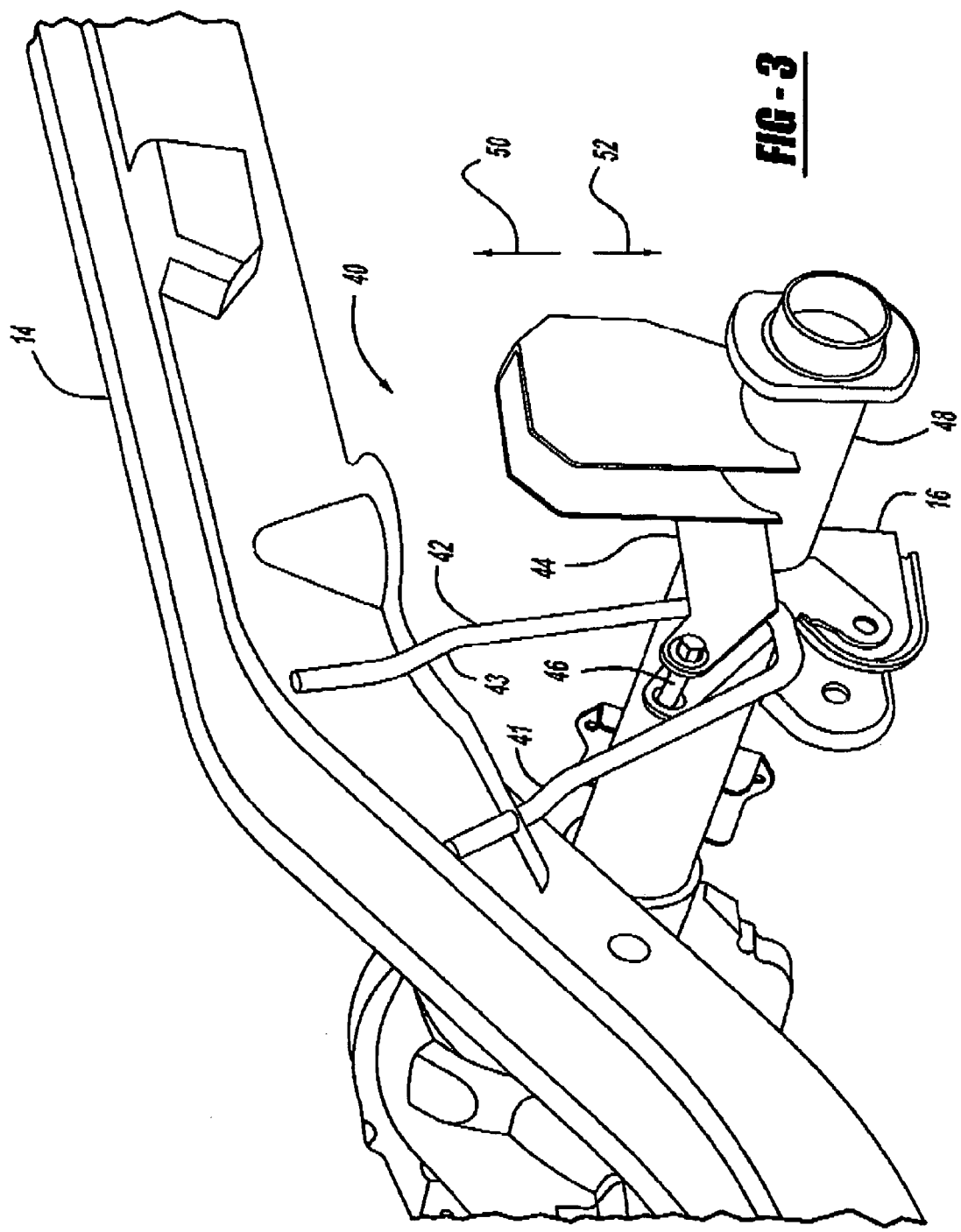
FIG. 3 is a perspective view of a rear suspension depicting the location of a suspension interlock system in front of the rear axle according to a third embodiment of the present invention.

Turning to FIG. 3, the present invention according to a third embodiment is depicted. FIG. 3 only depicts pertinent portions of the third embodiment of the suspension interlock system and omits other, unnecessary portions of the vehicle in exhibiting the operative workings of the third embodiment. FIG. 3 depicts the trailing link bracket 16 mounted to the vehicle axle 48 and shows the upward direction 50 and downward direction 52 that the axle 48 may move when a vehicle is in use or undergoes a rear impact event. Also depicted is a loop 42 and pin 46 arrangement. The loop 42 is attached to the frame rail 14 by an acceptable means such as by using a bolted bracket (not shown) to secure the loop 42 to the frame rail 14, by welding, etc. When the vehicle is in use, the vehicle axle 48 moves upward and downward such that the securing pin 46 moves within the confines of the loop 42 and frame rail 14. The significance of the pin 46 remaining within the confines of the loop 42 and the frame rail 14 will be discussed later. Additionally, the pin plate 44, to which the pin 46 is attached to, may be secured to the axle 48.

Figure 4:
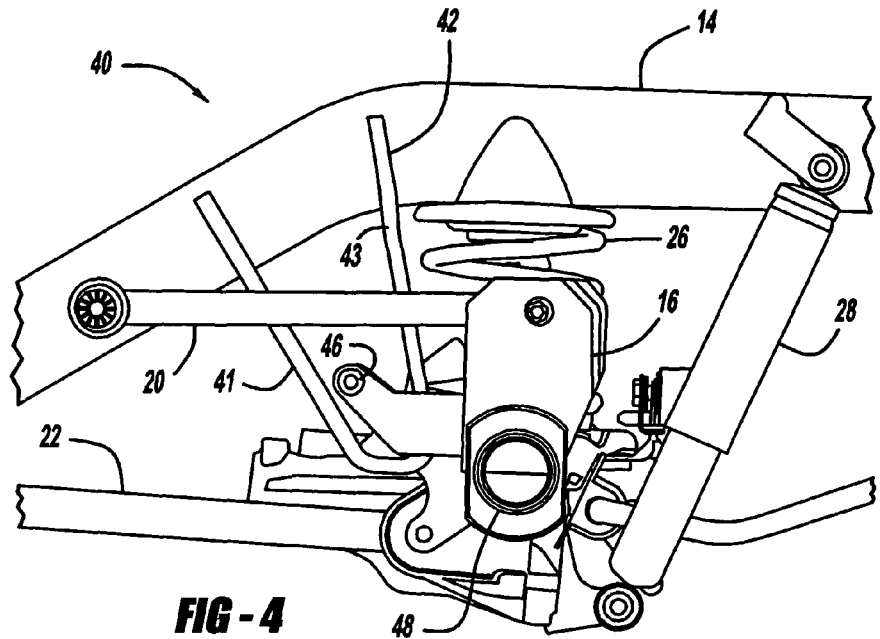
FIG. 4 is a side view of the rear suspension interlock system of FIG. 3.

FIG. 4 is a side view of the third embodiment of the suspension interlock system 40. In the side view of FIG. 4, the rear wheel (not shown) is removed to permit viewing of components of the suspension interlock system 40. The loop 42 is shown to possess a front bar 41 and a rear bar 43. Additionally, the loop 42 and pin 46 are located in front of the axle; however, the loop 42 and pin 46 could be located behind the axle 48 or even over the axle 48 depending upon the packaging requirements of the vehicle in which the suspension interlock system 40 is installed.

Figure 5:
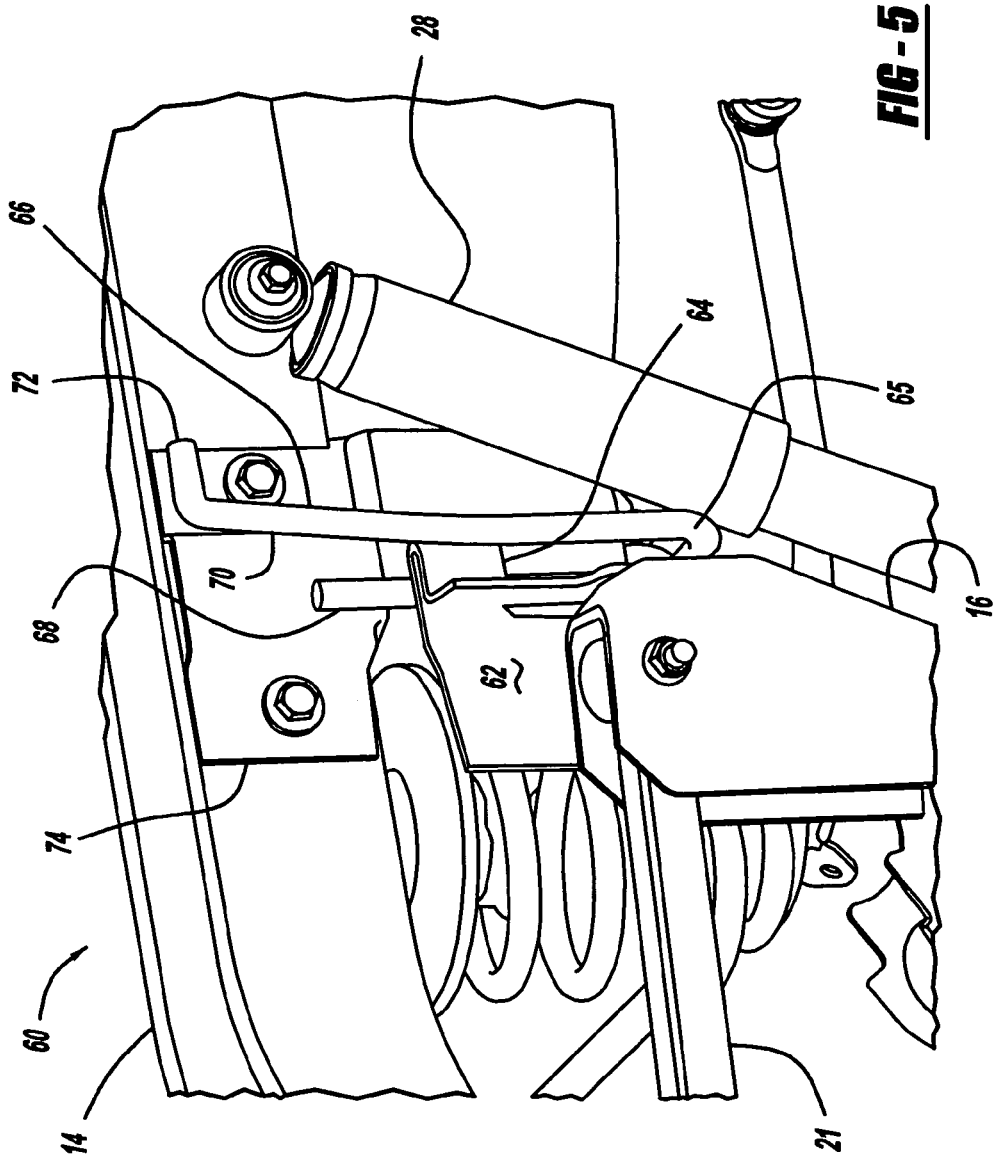
FIG. 5 is a perspective view of a hook and loop arrangement of a suspension interlock system according to a fourth embodiment of the present invention.

FIG. 5 is a perspective view of a fourth embodiment of a suspension interlock system 60 of the present invention. The suspension interlock system 60 of the fourth embodiment includes a loop 66 that may be a steel bar loop that is generally formed of an outside bar 70 and an inside bar 68. The outside bar 70 has a hook 72 that may be used for mounting purposes. Generally, the loop 66 mounts between the frame rail 14 and the bracket 74, which holds the loop 66 in place during its use as a suspension interlock device. The plate 62 has a hook 64 that is located between the inside bar 68 and outside bar 70. The hook 64 is permitted to travel within the confines of the loop 66 with the loop acting as a restraining device to prevent the hook 64 portion of the plate 62 from moving beyond the confines of the loop 66. Because the plate 62 is attached to components of the vehicle suspension system, the hook 64, plate 62 and loop 66 prevent the suspension system from separating from adjacent the vehicle frame 14. The plate 62 may be mounted to the trailing link bracket 16, axle 48, or other suitable component.

Figure 6:
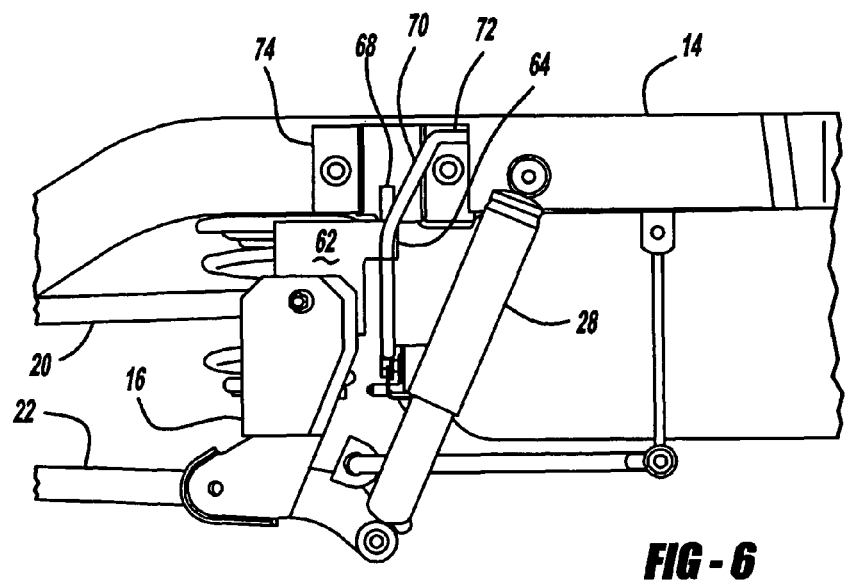
FIG. 6 is a side view of the hook and loop arrangement according to the fourth embodiment of the present invention.

FIG. 6 is a side view of the suspension interlock system 60 of the fourth embodiment of the present invention. FIG. 6 depicts the positional relationship of the inside bar 68, outside bar 70, the plate 62, and plate hook 64. As shown, the plate hook 64 protrudes from the plate 62 such that the plate hook 64 passes through the loop 66. The bracket 74 secures the inside bar 68 and outside bar 70 from moving away from the frame rail 14. Although shown secured with a bracket 74, the inside bar 68 and outside bar 70 may be secured by welding the bars 68, 70 to the frame rail 14.

The operative workings of the various embodiments of the present invention will now be presented. FIGS. 7 and 8 depict the rear of a vehicle 93 in which the suspension interlock system 60 depicted in FIGS. 5 and 6 is invoked; however, the operative workings of the various embodiments are similar and the effects of the various embodiments are designed to be equal. In explaining the operative workings as they relate to FIGS. 5 and 6, the operative workings of the other embodiments may be presented. FIGS. 7 and 8 depict a load 90 that possess a force represented by force arrow 92. The load 90 and force are directed toward the rear of the vehicle 93. The load 90 is representative of an impacting vehicle that may strike the rear end of the vehicle 93 in a rear impact event of the vehicle 93. FIG. 7 depicts the upper trailing link 20 and lower trailing link 22 in their pre-impact, horizontal positions. The axle 48 is positioned between the upper trailing link 20 and lower trailing link 22. At each end of the axle 48 a wheel 97 is attached. The differential 94 is shown protruding rearward of the axle 48, both of which are positioned adjacent the spare wheel 96. Although a spare wheel 96 is described, the spare wheel 96 location could also be occupied by a spare wheel container, a storage recession in the rear floor of the vehicle 93, or other object that might occupy the space depicted as a spare wheel 96.

As depicted in FIG. 8, when the load 90 strikes the vehicle 93 at impact location 98 during a rear impact event as an example, the frame rail 14 is affected by a force, as depicted with force arrow 100, while the spare wheel 96 is affected by a force, as depicted with force arrow 102. The force arrows 100, 102 are the transfer and absorption of the load force of load 90. The force of impact 92 causes the spare wheel 96 to be directed into the rear axle assembly 104, namely the differential 94, the rear axle 48, and rear suspension links 20, 22. When the spare wheel 96 meets the rear axle assembly 104, the impact force of such meeting causes the rear axle assembly 104 to begin pivoting about pivot point 106 of the upper trailing link 20, and pivot point 108 of the lower trailing link 22. The pivoting about pivot points 106, 108 is due to a downward force acting on the upper trailing link 20 and lower trailing link 22 from the force 102 acting on the differential cover 94, rear axle 48, and other rear suspension components.

As the spare wheel 96 force 102 acts on the rear axle assembly 104, forces act concurrently through the upper trailing link 20 as shown by force 110 and lower trailing link 22 as force 112. The forces in the trailing links 20, 22 are immediately transferred into the frame rail 14, the process of which will now be explained.

The forces resulting from the load 90 impact are initially divided between the frame rail 14 and the spare wheel 96. An advantage of the present invention is that the force that impacts the spare wheel 96 is then transferred into the frame rail 15 in a more forward position in front of the rear axle assembly 104 through the rear suspension components such as the upper trailing link 20 and lower trailing link 22. By dividing and transferring the impact force from force arrow 92 to both force arrow 100 and force arrow 102, the force of impact is more evenly distributed than if the frame rail 14 completely absorbs all of the impact. By dividing the force, the impact load subjected to the frame rail 14 aft of the rear axle assembly 104 is lessened. This permits more of the load 90 to be absorbed by more of the vehicle structure, more specifically, the frame rail 15 in front of the rear suspension instead of that part of the frame rail above the spare wheel 96. Without the suspension interlock system of the present invention, the frame rail 14 above the spare tire 96 absorbs all of the impact forces from the rear impact. This may cause the frame rail 14 to buckle as the rear suspension components move away from the frame rail 14 due to the impacting forces. Generally, the rear suspension components and rear axle assembly 104 are not able to absorb the rear impact forces when they separate from the frame rail 14 during a rear impact.

To accomplish this force distribution, the suspension interlock system depicted in FIGS. 7 and 8 will be explained. When the load 90 strikes the rear end of vehicle 93, the frame rail 14 may begin to buckle upwards in accordance with direction arrow 99. As the load 90 continues moving into the rear of the vehicle 93, the load strikes the spare wheel 96, which may be forced into the rear axle assembly 104. When the rear axle assembly 104 makes contact with the load 90, the rear axle assembly 104 begins moving downward according to arrow 101, which invokes the suspension interlock system 60. FIGS. 7 and 8 do not show the relative repositioning of the frame 14 and rear wheel 96. Instead, the result of such repositioning is reflected in the rear axle assembly 104.

With reference to FIGS. 5-8, the inside bar 68 and outside bar 70, together with the frame rail 14, contain the hook 64 of plate 62. Upon the impact of load 90, the inside bar 68 and outside bar 70 remain attached to, and move in conjunction with, the frame rail 14. The hook 64, which protrudes from the plate 62, begins moving downward in accordance with arrow 101 as the rear axle assembly 104 begins pivoting downward, which is also clockwise in FIG. 8, about pivot points 106, 108. As the rear axle assembly 104 continues pivoting about pivot points 106, 108, the hook 64, moving downward, eventually reaches the confining limit 65 (FIG. 5) of the confining inside bar 68 and outside bar 70. When the hook 64 reaches the confining limit 65, the rear axle assembly 104 stops independently pivoting about pivot points 106, 108.

With the hook 64 of the plate 62 at its confining limit 65, the inside bar 68 and outside bar 70 are placed into tension. When placed under tension, two occurrences become evident. The first occurrence is that the frame rail 14 and rear axle assembly 104 begin to bear the load in concert, as opposed to the frame rail 14 alone, since the rear axle assembly 104 is restrained by the hook 64 within the inside bar 68 and outside bar 70. The second occurrence is that the rear axle assembly 104 is held adjacent the frame rail 14, proximate its pre-collision position. Because the rear axle assembly 104 is held adjacent the frame rail 14, the rear axle assembly 104 is held in the line of force 92 and receives a force 102.

With the force 102 passing into the spare wheel 96, which contacts the differential 94 and axle 48, the force 102 then passes into the upper trailing link 20 as evidenced by force arrow 110 and the lower trailing link 22 as evidenced by the force arrow 112. Upon the forces 110, 112 passing into the links 20, 22 they then pass into the frame rail 15. More specifically, the force passing through the upper trailing link 20 passes into the frame rail 15 as force 114 and then the combined force of force 114 and the lower trailing link force 112 combine as force 116, which passes into the frame rail 15 in front of the rear axle assembly 104.

While FIGS. 7 and 8 depict a plate 62, hook 64, and loop 66 arrangement, the arrangements of other embodiments will accomplish the same task. For example, if the circular cable 12 (FIG. 1) or flat cable 32 (FIG. 2) is utilized in place of the plate 62, hook 64, and loop 66 arrangement, when the impact of the load 90 strikes the vehicle 93, the result is the same. For instance, since the cable 12 and flat cable 32 are attached to the frame 14 and the suspension system, such as the trailing link bracket 16, the cable 12, 32 will extend as far as its length will permit as the axle assembly pivots as a result of the impact, and then the cable 12, 32 will reach its limit. When the cable 12, 32, reaches its limit, the rear axle assembly 104 is held adjacent the frame rail 14, proximate its original, non-impact position to transfer forces into the frame rail 15 in front of the rear axle assembly 104 in accordance with the force transfer described above.

Like the cable 12, 32 and the plate 62, hook 64, and loop 66 arrangement, the loop 42 and pin 46 arrangement of FIGS. 3 and 4 could be used to restrain the rear vehicle suspension, including the rear axle assembly 104 adjacent the rear frame rail 14. During a rear impact event, when the rear axle assembly 104 moves downward, the pin 46 moves within the loop 42 until the pin 46 meets the limit of its travel within the loop 42. When this occurs, the rear axle assembly 104 is held adjacent the frame rail 14, proximate its original, non-impact position to transfer forces into the frame rail 15 in front of the rear axle assembly 104 (FIGS. 7 and 8), in accordance with the force transfer described above.

An advantage of the above embodiments of the invention is that the frame rail 14 and the rear axle assembly 104 share the load 90 of a rear impact collision, and the rear axle assembly is held under the frame rail 14, proximate its original position. Additionally, more of the force of the impact is directed into the frame rail 15, as indicated by the force arrows 102, 110, 112, 114, and 116.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a vehicle having a suspension system including a rear suspension component that supports a rear wheel end relative to a vehicle frame for movement over a normal range of movement including a maximum normal displacement away from the vehicle frame, an apparatus for restraining movement of the rear wheel end away from the vehicle frame during a rear vehicle impact comprising:
a device attached to the vehicle frame and the rear suspension component, the device being arranged to limit movement of the rear wheel end away from the vehicle frame only when the rear wheel end moves away from the vehicle frame to a limit displacement that is at least as great as the maximum normal displacement, whereby the vehicle frame and the suspension system bear in concert a load from the rear impact when the rear impact causes the wheel end to be moved to the limit displacement.

2. The apparatus of claim 1, wherein the device includes a first piece attached to the vehicle frame and a second piece attached to the rear suspension component, the first piece contacting the second piece to limit movement of the rear wheel end away from the vehicle frame only when the rear wheel end moves to the limit displacement.

3. The apparatus of claim 2, wherein the rear suspension component is a rear axle.

4. An interlock system for a vehicle suspension including a rear suspension component that supports a rear wheel end relative to a vehicle frame for movement over a normal range of movement including a maximum normal displacement away from the vehicle frame, the interlock system comprising:
a u-shaped bar, wherein the u-shaped bar is attached to a vehicle frame to form a vertically-extending loop proximate to the rear wheel end; and
a bar stop on the rear suspension component, wherein the bar stop projects into the loop formed by the u-shaped bar, and wherein the bar stop contacts the u-shaped bar only when the rear wheel end moves away from the vehicle frame to a limit displacement that is at least as great as the maximum normal displacement, whereby the vehicle frame and the suspension system to bear in concert a load from the rear impact when a rear impact causes the rear wheel end to be moved to the limit displacement.

5. The vehicle suspension interlock system of claim 4, the bar further comprising:
a bar first end and a bar second end, wherein the bar ends are attached to the vehicle frame.

6. The vehicle suspension interlock system of claim 4, wherein the bar and bar stop are located in front of a rear axle.

7. The vehicle suspension interlock of claim 4, wherein the bar stop is a pin.

8. The vehicle suspension interlock of claim 4, wherein the bar stop is a plate.

9. A suspension restraint for a vehicle having a frame, and a rear suspension on the frame including a suspension component supporting a rear wheel end relative to the frame for movement over a normal range of movement up to a maximum normal displacement away from the frame, the restraint being attached to the frame and operative to limit movement of the suspension component away from the frame only when the rear wheel end moves away from the frame to a predetermined displacement limit that is at least as great at the maximum normal displacement, whereby the vehicle frame and the rear suspension share a rear impact when a rear impact causes the rear wheel end to be moved to the limit displacement.

10. The apparatus of claim 9, wherein the limit displacement is greater than the maximum normal displacement.

* * * * *